United States Patent
Zeng (10) Patent No.: US 9,313,166 B1
(45) Date of Patent: Apr. 12, 2016

(54) ENHANCEMENT OF MACHINE LEARNING TECHNIQUES FOR AN ELECTRONIC MESSAGE SYSTEM

(71) Applicant: InsideSales.com, Inc., Provo, UT (US)

(72) Inventor: Xinchuan Zeng, Orem, UT (US)

(73) Assignee: InsideSales.com, Inc., Provo, UT (US)

( * ) Notice: Subject to any disclaimer, the term of this patent is extended or adjusted under 35 U.S.C. 154(b) by 0 days.

(21) Appl. No.: 14/699,990

(22) Filed: Apr. 29, 2015

(51) Int. Cl.
*H04L 12/58* (2006.01)
*G06N 99/00* (2010.01)

(52) U.S. Cl.
CPC .............. *H04L 51/32* (2013.01); *G06N 99/005* (2013.01)

(58) Field of Classification Search
CPC .............................. G06N 99/005; H04L 51/32
See application file for complete search history.

(56) References Cited

U.S. PATENT DOCUMENTS

| | | | |
|---|---|---|---|
| 2014/0066044 A1* | 3/2014 | Ramnani et al. | 455/418 |
| 2014/0280207 A1* | 9/2014 | Renders et al. | 707/748 |
| 2015/0089399 A1* | 3/2015 | Megill et al. | 715/753 |
| 2015/0100356 A1* | 4/2015 | Bessler et al. | 705/7.12 |

* cited by examiner

*Primary Examiner* — Alan Chen
(74) *Attorney, Agent, or Firm* — Hickman Palermo Becker Bingham LLP (57) ABSTRACT

Techniques are described herein for classifying an electronic message with a particular project from among a plurality of projects. In some embodiments, first and second users associated with the electronic message are identified, and one or more first projects associated with the first user and one and more second projects associated with the second user are determined. Projects that are in common between the first projects and the second projects are determined. When only a single project is in common, the electronic message is associated with the single project. When more than a single project is in common, features associated with each of the projects found to be in common are analyzed by a machine learning model to determine the most likely project to associate with the electronic message from among the projects found to be in common.

19 Claims, 5 Drawing Sheets

ENHANCEMENT OF MACHINE LEARNING TECHNIQUES FOR AN ELECTRONIC MESSAGE SYSTEM

FIELD OF THE DISCLOSURE

The present disclosure relates to techniques for automatic classification of electronic messages generated within an electronic messaging system, and in particular, to machine learning techniques for performing the automatic classification of the electronic messages.

BACKGROUND

Electronic messages are used in the workplace for various work-related activities. For instance, electronic mails are often exchanged between users working for different organizations in connection with a particular project, such as making a business deal, selling or purchasing a particular good or service, exchanging documents or information, or pursuing a particular opportunity. Even for a small organization, the number of previous and present projects may be numerous. This is especially the case if a project is defined in a granular manner to distinguish between each unique transaction, taking into account parameters such as a particular good or service involved, particular users involved, a particular account for a particular organization, and the like. The number of electronic mails for any particular project may also be large. Thus, a very large number of electronic mails can exist about projects for a given organization.

Classification of electronic mails by project is useful, among other things, for recordkeeping and organizational purposes. A system may group two electronic mails together if the two electronic mails have a matching subject line. Accordingly, even if a first electronic mail and a second electronic mail discuss the same project, the electronic mails will not be associated with each other if the subject field in the first electronic mail is different than the subject field in the second electronic mail.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The accompanying drawings illustrate several example embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

While each of the drawing illustrates a particular embodiment for purposes of illustrating a clear example, other embodiments may omit, add to, reorder, and/or modify any of the elements shown in the drawings. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present disclosure.

Various modifications to the embodiments will be readily apparent to those skilled in the art, and principles defined herein may be applied to other embodiments and applications without departing from the spirit and scope of the invention. Moreover, in the following description, numerous details are set forth for the purpose of explanation. However, one of ordinary skill in the art will realize that embodiments may be practiced without the use of these specific details. In other instances, well-known structures and processes are not shown in block diagram form in order not to obscure the description of embodiments with unnecessary detail. Thus, the present disclosure is not intended to be limited to the embodiments shown, but is to be accorded the widest scope consistent with the principles and features disclosed herein.

TERMS

In some embodiments, the terms used herein may refer to the following:

An "electronic message" may be any electronically-generated and/or -transmitted message, such as an electronic mail (hereinafter "email") generated/transmitted via an email system, a text generated/transmitted via a texting system, an instant message generated/transmitted via an instant messaging system, or any other message or content portion generated/transmitted via any computing device or system.

A "project" comprises any transaction, at any stage of completion, concerning a particular good or service between one or more particular users affiliated with a first organization or entity and one or more particular users affiliated with a second organization or entity that is different from the first organization or entity. Projects include deals; sales; purchases; contracts; negotiations; inquiries; opportunities to make any of deals, sales, purchases, contracts, negotiations, or inquiries; or any other possible transactions involving goods or services. In some embodiments, projects may be referred to as "opportunities." For example, an opportunity to sell a good G to a person A at company C is considered to be a different project from an opportunity to sell a good G to a person B at a company C. Projects are typically more granular than an "account." A project can be associated with one or more sales reps, contacts, or leads, as described in more detail below.

A single "account" can be associated with one or more projects.

A "sales rep" is a sender or recipient identified in an electronic message who is assigned or designated to sell certain goods or services for an organization or entity to persons outside the organization or entity. A sales rep can be associated with one or more projects. More than one sales rep may be associated with a particular project.

A "lead" is a sender or recipient identified in an electronic message who may be a potential buyer, an influencer of the actual buyer, or a person who is later designated as a "contact." A lead can be associated with one or more projects. More than one lead may be associated with a particular project. In some embodiments, the terms "lead" and "contact" may be used interchangeably.

A "contact" is a sender or recipient identified in an electronic message who is assigned or designated as a buyer or potential buyer. A contact can be associated with one or more projects. More than one contact may be associated with a particular project.

A "case" may be a support issue, complaint, or other item relating to a project, and may comprise one or more support tickets that indicate steps taken to solve the case. For example, if a person is using a product sold to the person by a company and the person encounters an issue (e.g., implementation issue or bug), then the person may file a complaint with the company. The company, in turn, may generate a particular ticket or case concerning the complaint.

A "partner" may be any party or type of business alliance or relationship between organizations or entities. For example, partner information may relate to a type of an account.

A "computer" may refer to one or more physical computers, virtual computers, and/or computing devices. As an example, a computer may be one or more servers, cloud-based computers, a cloud-based cluster of computers, virtual machine instances or virtual machine computing components such as virtual processors, storage and memory, data centers, storage devices, desktop computers, laptop computers, mobile devices, and/or any other special-purpose computing devices. References to "a computer," "a server," "a client," or any other computer herein may comprise one or more computers, unless expressly stated otherwise.

GENERAL OVERVIEW

In an embodiment, a programmatic method enables automatically classifying an electronic message (e.g., email) to a particular project from among a plurality of projects for an organization or entity (e.g. a company). Based on the sender and recipient users specified in the electronic message, all projects from among the plurality of projects mapped to the sender user(s) and all projects from among the plurality of projects mapped to the recipient user(s) are preliminarily identified. Next, all of the projects in common between these two groups of identified projects are determined.

If only a single project is in common between these two groups of identified projects, then the single project is the particular project to associate with the electronic message. If more than one project is in common between these two groups of identified projects, then additional information about the electronic message, each of the projects in common (also referred to as candidate projects), and correlations between the electronic message and each of the candidate projects (collectively referred to as feature sets) are collected, collated, and/or derived to build sets of a plurality of contextual and related information to narrow down the candidate projects to a single most relevant project to the electronic message. In some embodiments, further additional information from the interaction history (e.g., previous emails) may be accessed to determine the most relevant project from among the candidate projects.

The feature sets are used as inputs to a trained machine learning model, and in turn, a project score is outputted by the model for each of the candidate projects. The project scores represent a measure or prediction relative to each other that a given project is the most relevant project from among the candidate projects for the electronic message.

The programmatic method further enables collaboration with user(s) to determine the most relevant project from among the candidate projects in some embodiments. The machine learning model is trained using feature sets and classifications of previous electronic messages.

In this manner, techniques to improve classification of electronic messages by projects are disclosed herein. By performing classification based on more than the information contained in the electronic messages itself and drawing from the already existing wealth of contextual information and/or historical information relating to the electronic messages and projects, the classification predictions are more accurate. Over time, the feedback loop of applying classification of present electronic messages to further train the machine learning model results in improved accuracy of classification predictions of future electronic messages. These and other details regarding electronic message classification techniques are discussed in detail below.

Example Computer System Implementation

Figure 1:
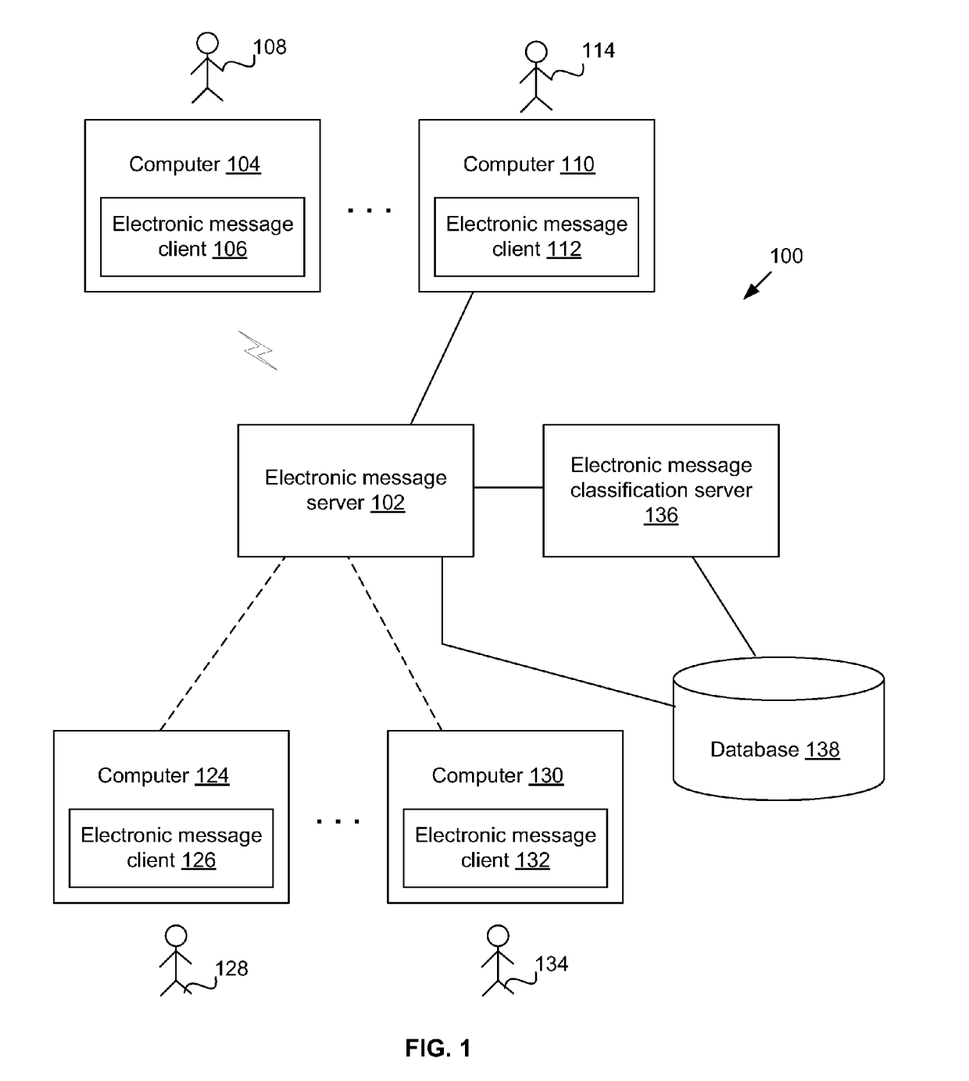
FIG. 1 illustrates an example system for determining a particular project to associate with an electronic message according to some embodiments.

FIG. 1 illustrates an example system 100 in which the techniques described may be practiced, according to some embodiments. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes an electronic message server 102, a plurality of computers 104, 110, 124, and 130, a server 136, and a database 138. Electronic message server 102 comprises one or more servers, computers, processors, database servers, and/or computing devices configured to communicate with computers 104, 110, 124, 130, server 136, and/or database 138. Electronic message server 102, also referred to as a server 102, hosts one or more applications and associated data to manage and direct inbound and outbound electronic messages for an organization or entity, as described in detail below.

In an embodiment, electronic messages generated at computers 104 and/or 110, e.g., outbound electronic messages, are sent to the electronic message server 102 for transmission to the appropriate component(s), which in turn, delivers the electronic messages to the intended recipient(s). Conversely, electronic messages generated at computers 124 and/or 130, e.g., inbound electronic messages, are received by the electronic message server 102 from appropriate component(s) for delivery to respective computers 104 and/110. Although not shown, electronic message server 102 may communicate with a wired or wireless communications network to transmit outbound electronic messages and/or receive inbound electronic messages. The communications network may comprise a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks.

Electronic message server 102 may be located at one or more geographically distributed locations. Although one server 102 is shown in FIG. 1, system 100 may, depending on the embodiment, comprise one, two, or any number of servers 102, which may work alone and/or collectively to provide the functionality described herein.

Computers 104, 110, 124, and 130 comprise computing devices or clients, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the computers 104, 110, 124, and 130 includes applications, software, and/or other executable instructions to facilitate various aspects of the techniques described herein. Computers 104, 110, 124, and 130 may also include additional applications or other interface capabilities to communicate with the server 102. For example, computers 104, 110, 124, and 130 include an electronic message client application 104, 112, 124, and 132, respectively, for respective users 108, 114, 128, and 134 to compose, receive, transmit, view, and/or otherwise interface with the electronic messages at the computers. Users 108, 114, 128, 134 may be sales representatives, contact persons, lead or referral persons, or other persons involved in the electronic message classification techniques described herein.

In an embodiment, computers 104 and 110 are directly associated with electronic message server 102 while computers 124 and 130 may associate (indirectly) with electronic message server 102 to the extent that electronic messages sent from computers 124 and/or 130 are intended for delivery to computers 104 and/or 110. Although two computers 104, 110 are shown in FIG. 1 in association with server 102, more or less than two computers may be included in system 100. Similarly, more or less than two computers 124, 130 may be included in system 100.

Server 136 comprises one or more servers, computers, processors, database servers, and/or computing devices configured to communicate with the electronic message server 102 and/or database 138. Server 136 includes applications, software, and/or other executable instructions to perform various aspects of the electronic message classification techniques described herein. Server 136 may also be referred to as an electronic message classification server. Server 136 may be located at one or more geographically distributed locations. Although one server 136 is shown in FIG. 1, system 100 may, depending on the embodiment, comprise one, two, or any number of servers 136, which may work alone and/or collectively to provide the functionality described herein. In some embodiments, some or all of the functionalities of electronic message server 102 may be included in the server 136. In which case, computers 104, 110, 124, 130 may communicate with the server 136. In alternative embodiments, each of computers 104, 110, 124, and 130 includes a client application (which may be the same or different than electronic client 106, 112, 126, or 132) that uploaded received electronic messages to the server 136 for classification.

Database 138 comprises one or more databases, data stores, or storage devices configured to store and maintain historical electronic messages, data associated with electronic messages, data derived from electronic messages, mapping data, electronic message classification data, machine learning data, other data, and/or instructions for use by server 136 and/or electronic message server 102 as described herein. Database 138 may, in some embodiments, be located at one or more geographically distributed locations relative to servers 102 and/or 136. Server 102 and/or 136 may, in some embodiments, access database 138 via a communications network or without use of a communications network. As another alternative, database 138 may be included within server 136 and/or 102. System 100 may, depending on the embodiment, comprise one, two, or any number of databases 138 configured to individually and/or collectively store the data described herein.

Figure 2:
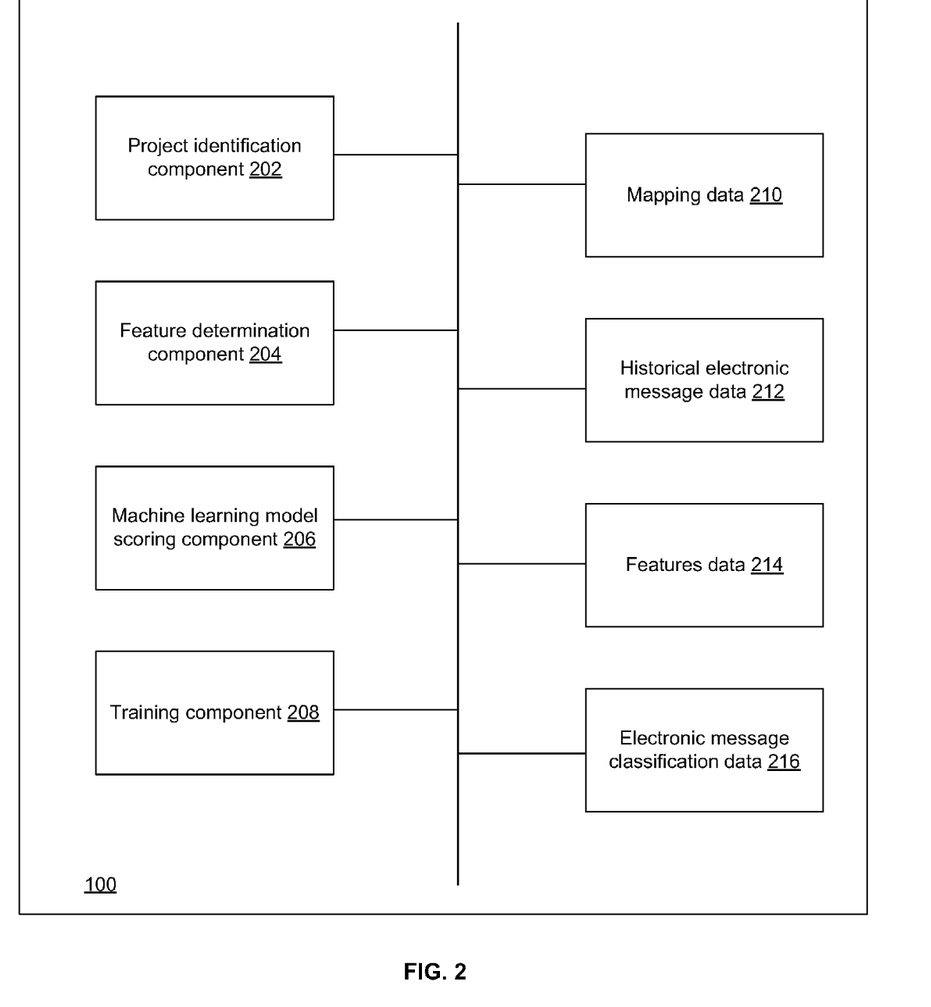
FIG. 2 illustrates example components and data included in the system of FIG. 1 according to some embodiments.

FIG. 2 illustrates example components and data that may be included in system 100 to determine features associated with electronic messages, identify projects associated with electronic messages, perform electronic message classification, train a machine learning model, and associated functionalities, according to some embodiments. The various components and/or data of system 100 are implemented at least partially by hardware at one or more computing devices, such as one or more hardware processors executing instructions stored in one or more memories for performing various functions described herein. The components and/or data are communicatively coupled (e.g., via appropriate interfaces) to each other and to various data sources, so as to allow information to be passed between the components and/or to share and access common data. FIG. 2 illustrates only one of many possible arrangements of components and data configured to perform the functionality described herein. Other arrangements may include fewer or different components and/or data, and the division of work between the components and/or data may vary depending on the arrangement.

In an embodiment, system 100 includes, but is not limited to, a project identification component 202, a feature determination component 204, a machine learning model scoring component 206, and a machine learning model training component 208. Components 202-208 can be included in the server 136. In other embodiments, components 202-208 are included in one or more of server 102 and/or database 138.

In an embodiment, system 100 further includes data such as, but not limited to, mapping data 210, historical electronic message data 212, features data 214, and electronic message classification data 216. Data 210-216 can be included in the database 138.

As discussed in greater detail below, the project identification component 202 determines one or more candidate or potential projects that may be associated with a given electronic message received by or transmitted to electronic message server 102 for an organization or entity. Mapping data 210 may be used to identify the candidate project(s).

If only a single candidate project is determined for the given electronic message, then the given electronic message is classified as belonging to the single candidate project. Otherwise, the feature determination component 204 determines a set of features (also referred to as a feature vector) for each candidate project of the plurality of candidate projects for the given electronic message. In an embodiment, a set of features for a candidate project may include information about and relating to the given electronic message, information about and relating to the given candidate project, and information about and relating to the correlation (e.g., similarity) between the given electronic message and the candidate project. Feature determination component 204 may use data included in the mapping data 210, historical electronic message data 212, and/or features data 214 to construct each of the respective set of features for a candidate project.

The machine learning model scoring component 206 applies the feature set for each of the candidate projects for the given electronic message as inputs to a machine learning (ML) model. The ML model outputs a set of scores comprising a score for each of the candidate projects relative to each other, the scores being representative of the degree of likelihood that a given candidate project is the project to which the given electronic message actually refers. In an embodiment, the given electronic message is associated with, or classified as belonging to, the candidate project corresponding to the highest score from among the set of scores. In another embodiment, the scores are provided to user(s) for final determination of the project corresponding to the given electronic message. The scores and selection of the project from among the candidate projects are maintained within the electronic message classification data 216.

Training component 208 uses information about classification of historical or previous electronic messages to train the ML model. The training component 208 may also be referred to as a feedback component, because training component 208 may continually or periodically update the ML model with additional information as new electronic messages are classified, thereby using an ever-expanding data set to iteratively improve future classifications.

In one embodiment, components 202-208 comprise one or more software components, programs, applications, or other units of code base or instructions configured to be executed by one or more processors included in the server 136. Although components 202-208 are depicted as distinct components in FIG. 2, components 202-208 may be implemented as fewer or more components than illustrated. Data 210-216 may be implemented as fewer or more data stores than illustrated. Data 210-216 may be organized in particular data structures, data tables, data spreadsheets, relational data scheme, and the like. Any of components 202-208 or data 210-216 may communicate with one or more devices included in the system 100, such as server 102, server 136, database 138, and/or computers 104, 110, 124, or 130.

Example Functional Implementation

Figure 3A:
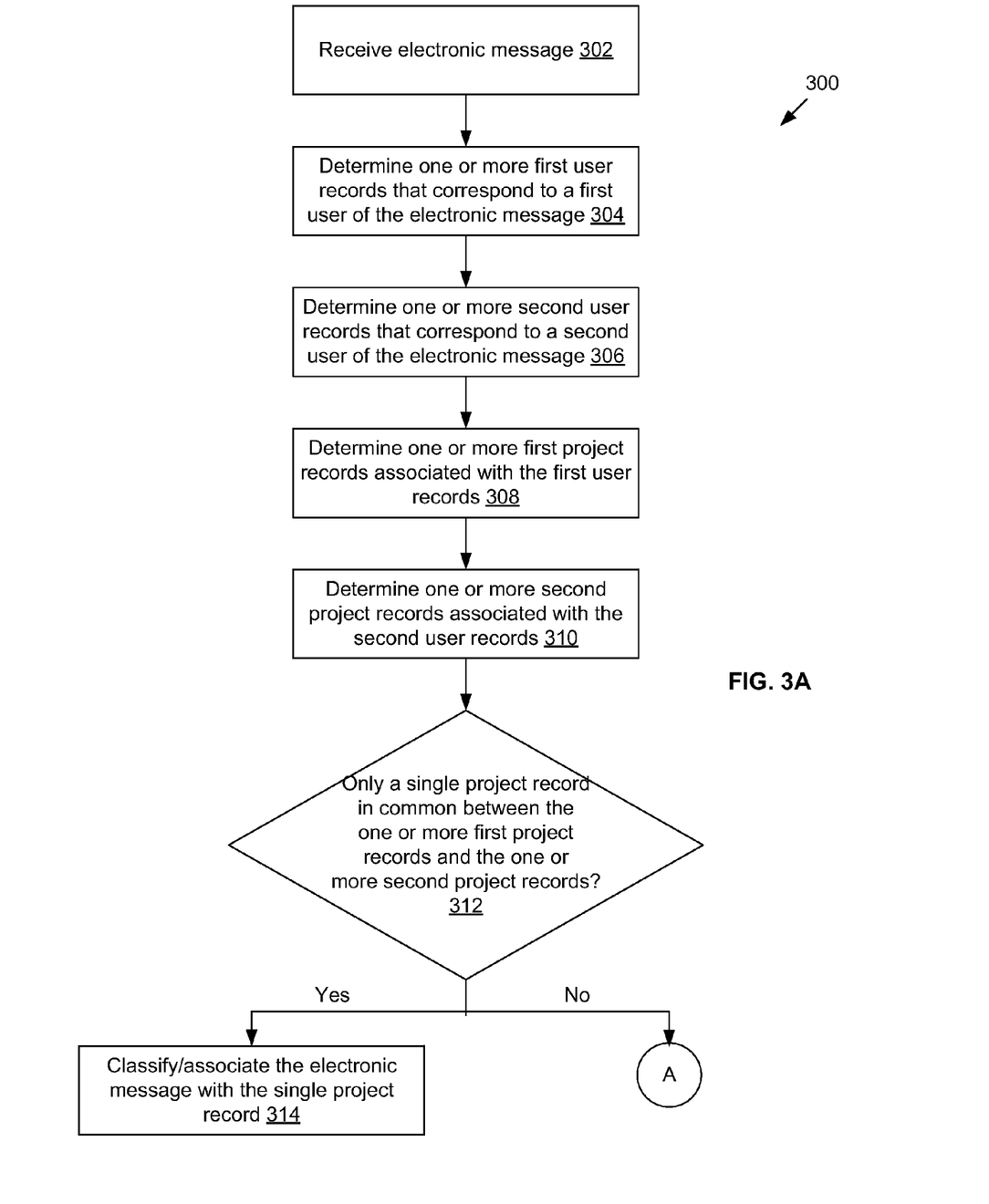
FIGS. 3A-3B depict an example flow for automatic classification or categorization of an electronic message with a particular project, according to some embodiments.
Figure 3B:
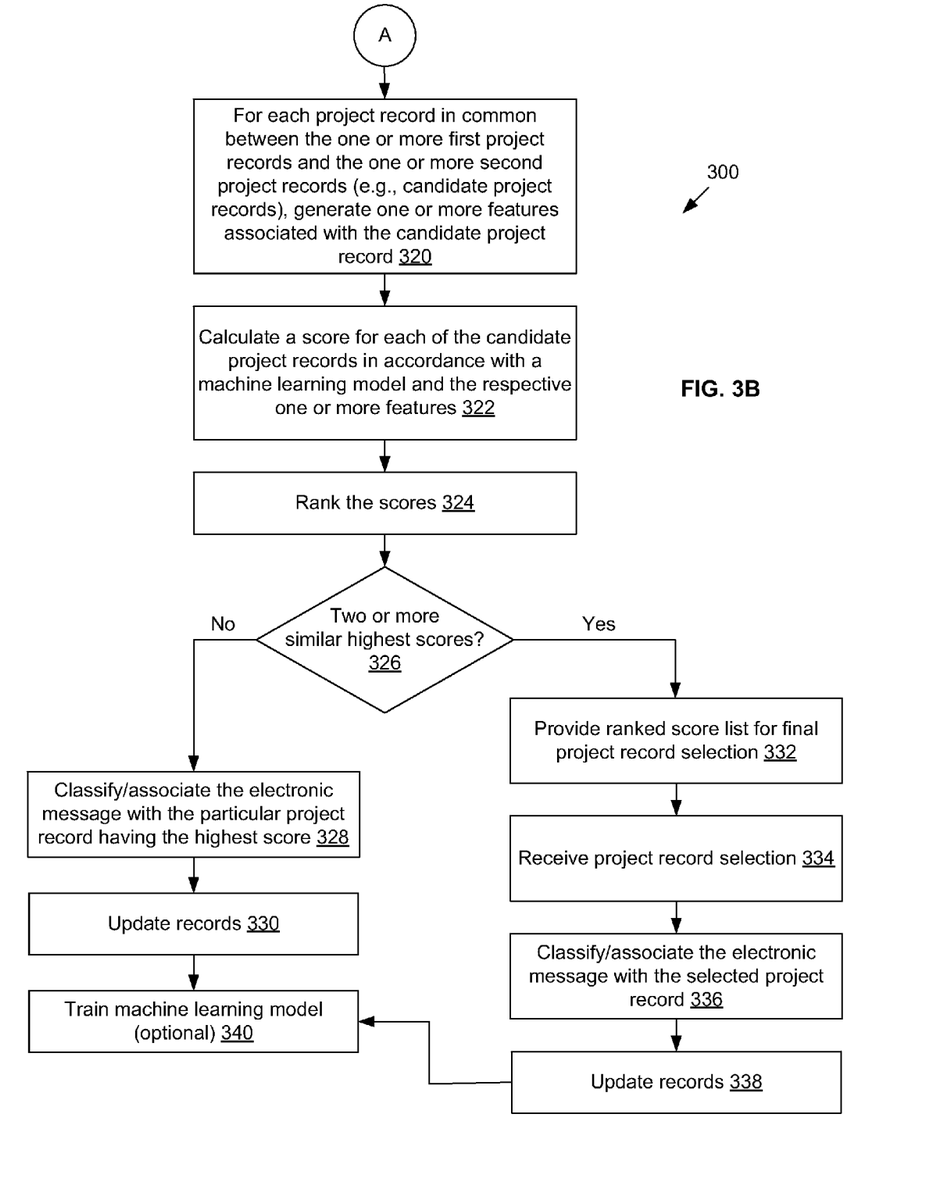

FIGS. 3A-3B depict an example flow 300 for automatic classification or categorization of an electronic message with a particular project, according to some embodiments. In an embodiment, each of the processes described in connection with the functional blocks of FIGS. 3A-3B may be implemented using one or more computer programs, other software elements, and/or digital logic in any of a general-purpose computer or a special-purpose computer, while performing data retrieval, transformation and storage operations that involve interacting with and transforming the physical state of memory of the computer. FIGS. 3A-3B are described below in conjunction with the components and data of FIG. 2, according to an embodiment. Flow 300 depicts example techniques corresponding to a particular electronic message. The process of flow 300 can be repeated for each of a plurality of electronic messages that are inbound and/or outbound for a given organization or entity. In an embodiment, the classification technique may be performed continually, periodically, in batch sets, or based on a trigger after an electronic message is received at the electronic message server 102.

In block 302, the project identification component 202 receives an electronic message to be classified. In an embodiment, the received electronic message may be an inbound or outbound electronic message at the electronic message server 102. The electronic message may be an electronic mail ("email") that includes a number of data fields such as, but not limited to: a To field specifying one or more receiver email addresses, a From field specifying one or more sender email addresses, a Subject field specifying a title or subject of the email, a body section containing the email content, one or more attachments to the email, a time/date stamp, and other data that may not be readily visible to the receivers and/or senders of the email (e.g., meta-data).

For purposes of illustrating a clear example, assume the following:

The received electronic message is an electronic message sent by users 128 and/or 134 to users 108 and/or 114.

The received electronic message is an inbound electronic message to the organization or entity (e.g., Entity A) associated with the server 102 and/or 136. Hence, the receiver/recipient is one or more users associated with Entity A and the sender is one or more users associated with an organization or entity that is different from Entity A (e.g., an Entity B).

Entity A is a seller of a good or service, and users associated with Entity A (e.g., users 108, 114) may be particular employees or agents of Entity A through which sales may be made. These users may be referred to as, but not limited to, sales representatives, representatives, sales reps, recipients, or the like.

Entity B is a buyer or potential buyer of Entity A's good or service, and users associated with Entity B (e.g., users 128, 134) may be particular employers or agents of Entity B authorized or tasked with making purchases on behalf of Entity B. Such users may be referred to as, but not limited to, contacts, senders, buyers, potential buyers, or the like.

Alternatively, the received electronic message may be an outbound electronic message and the conventions discussed above may be reversed. The classification techniques discussed in connection with FIGS. 3A-3B can also be performed on outbound electronic messages.

In block 304, the project identification component 202 determines one or more first user records that correspond to a first user of the electronic message received in block 302. And in block 306, the project identification component 202 determines one or more second user records that correspond to a second user of the electronic message received in block 302. The first and second users of the electronic message comprise the sender(s) and receiver(s) specified in the electronic message. In an embodiment, the project identification component 202 extracts the sender user information (e.g., email addresses in the From field) and receiver user information (e.g., email addresses in the To field) from the electronic message. Then the user record(s) corresponding to each of the sender user(s) and the receiver user(s) can be obtained using the mapping data 210 based on the extracted information. Alternatively, if the extracted email addresses are used as the unique user identifiers, then the project identification component 202 need not access the mapping data 210. The obtained user records, among other things, uniquely identify all of the sender and receiver users in the electronic message. If the sender and receiver users are referred to as contacts C and sales reps S, as discussed above, then the contact C identifier(s) and sales rep S identifier(s) may respectively be denoted as id(C) and id(S).

Mapping data 210 comprises data specifying the relationship or correspondence between particular ones of the different data elements involved in, or may be involved in, the classification prediction techniques described herein. The mappings may be user-defined (e.g., a particular sales rep specifies who the contact(s) are for a given project or account), entity-defined (e.g., a particular sales rep is assigned to a particular account), and/or derived from user interaction history (e.g., historical or previous electronic messages). A mapping may specify a one-to-many relationship, a many-to-one relationship, a one-to-one relationship, a many-to-many relationship, and any other possible combination of relationship specification between particular data elements.

In an embodiment, example mappings that can be included in mapping data 210 include, but are not limited to, all or a portion of the following mapping information. Note that depending on how the mapping information is organized or is considered the starting point, there may be some information redundancy.

For each of the one or more contacts, mapping data 210 may include data specifying a mapping between a particular contact (the contact information including at least the contact email address and other information such as the contact name, title, entity name, etc.) and each of the following particular users and data elements, if available:
   One or more projects;
   One or more cases;
   One or more sales reps (e.g., the sales rep that created the relationship with the particular contact or the current sales rep for the particular contact);
   One or more accounts.

For each of the one or more accounts, mapping data 210 may include data specifying a mapping between a particular account and each of the following particular users and data elements, if available:
   One or more contacts;
   One or more projects;
   One or more cases;
   One or more partners;
   Account creator (e.g., a particular sales rep who created the particular account);
   Account owner (e.g., a particular sales rep who is responsible for the particular account, which need not be the same as the account creator).

For each of the one or more leads (the lead information including at least the lead email address and other information such as the lead name, title, entity name, etc.), mapping data 210 may include data specifying a mapping between a particular lead and each of the following particular users, if available:
   Lead owner (e.g., a particular sales rep who created, cultivated, or originated the particular lead).

In an embodiment, for a particular project, a given user may be either a lead or a contact but not both. Accordingly, no leads or contacts should have the same information (e.g., email address) as each other for the particular project. A user that starts out as a lead may be converted to a contact over time.

For each of the one or more projects, mapping data 210 may include data specifying a mapping between a particular project and each of the following particular users and data elements, if available:
   One or more contacts;
   Account (e.g., a particular project has only one account);
   Project owner (e.g., a sales rep that "owns" or is responsible for the particular project);
   Project creator (e.g., a sales rep that created the particular project);
   User that last modified the project;
   One or more products;
   Contact roles (may be optional; e.g., additional information about the particular roles of the different contacts for the particular project, such as which of the contacts is the final decision maker).

For each of the one or more sales reps, mapping data 210 may include data specifying a mapping between a particular sales rep (the sales rep information including at least the sales rep email address and other information such as the sales rep name, title, entity name, etc.) and each of the following particular users and data elements, if available:
   One or more projects;
   One or more cases;
   One or more contacts;
   One or more accounts.

Once the identifiers of the first and second users of the electronic message are known, the project identification component 202 determines one or more first project records associated with the first user records, in block 308, and the one or more second project records associated with the second user records, in block 310. If a particular contact user is known (e.g., unique identifier is known), then all of the projects associated with the particular contact user can be looked-up in the mapping data 210. Similar look-up occurs for each of the remaining contact users and all of the sales rep users identified in blocks 304 and 306. Continuing the notation above:
   For a given id(C), the corresponding set of projects P for the contact C comprises: $P(C)=\{P[C,1], P[C,2], \ldots\}$;
   For a given id(S), the corresponding set of projects P for the sales rep S comprises: $P(S)=\{P[S,1], P[S,2], \ldots\}$.

Next, in block 312, the project identification component 202 identifies the interaction of or the common project record(s) between the one or more first project records and the one or more second project records. Project identification component 202 looks for the overlapping projects in the sets of projects P(C) and P(S). The resulting common or overlapping projects, which are a subset of P(C) and P(S), are denoted as P(C,S).

If only a single project record exists in common between the first and second project records (yes branch of block 312), then the project identification component 202 classifies or associates the received electronic message with that single common project record in block 314. And in block 316, one or more records or data store are updated accordingly to reflect at least the classification of the received electronic message to a particular project. For example, the historical electronic message data 212 (the received electronic message is now considered a historical/previous electronic message) and electronic message classification data 214 may be updated.

If more than one project record is in common between the one or more first project records and the one or more second project records (no branch of block 312), then a technique using a machine learning model is used to determine which project of the plurality of candidate projects represented by the common project records should be associated with the received electronic message. In block 320 of FIG. 3B, for each of the candidate projects, the feature determination component 204 retrieves and/or derives one or more features associated with the respective candidate project record. The one or more features for a candidate project record are also referred to as a feature set, feature vector, or input feature vector (inputs to the machine learning model) for the candidate project record.

Continuing the above notations, for candidate projects $P[1], P[2], \ldots, P[n]$ comprising the common projects P(C,S) for the received electronic message, respective feature sets Feat[1], Feat[2], ..., Feat[n] are generated.

In an embodiment, each feature set Feat[x], where x=1, 2, ..., n, comprises three parts:

Feat[x]=(Feat[E], Feat[P[x]], Feat[E, P[x]])

where Feat[E] comprises one or more features relating to the received electronic message E, Feat[P[x]] comprises one or more features relating to candidate project P[x], and Feat[E, P[x]] comprises one or more features relating to the correlation (e.g., similarity) between the electronic message E and the candidate project P[x]. Since n feature sets are generated or built, the resulting feature sets generated for the received electronic message E are as follows:

Feat[1]=(Feat[E], Feat[P[1]], Feat[E, P[1]])
Feat[2]=(Feat[E], Feat[P[2]], Feat[E, P[2]])
...
Feat[n]=(Feat[E], Feat[P[n]], Feat[E, P[n]]).

Note that Feat[E] is the same for every Feat[x], while Feat[P[x]] and Feat[E, P[x]] differ for each Feat[x] because Feat[P[x]] and Feat[E, P[x]] are specific to each candidate project x.

Features of the Electronic Message E

For the feature set Feat[x], the one or more features of the electronic message E (denoted as Feat[E] above), in turn, comprises at least three sub-parts:

Feat[E]=(Feat(E)(electronic message itself),
Feat(E)(sales rep id information),
Feat(E)(contact id information)).

Feat(E)(electronic message itself) comprises information about the electronic message itself. Feat(E)(sales rep id information) comprises information about the sales rep user specified in the electronic message. Feat(E)(contact id information) comprises information about the contact user specified in the electronic message.

The feature determination component 204 generates Feat(E)(electronic message itself), Feat(E)(sales rep id information), and Feat(E)(contact id information) based on the information provided in the electronic message itself and sales rep user and contact user information obtained from the mapping data 210.

Feat(E)(electronic message itself) comprises one or more of the following features:
  Electronic message content (e.g., body of the email);
  Electronic message title (e.g., subject line of the email);
  Electronic message sender (e.g., contact user email address(es));
  Electronic message receiver (e.g., sales rep user email address(es));
  Electronic message time/date stamp;
  Link(s) included in the electronic message, if available;
  Electronic message attachment(s), if available;
  Electronic message domain information;
  Electronic message meta-data;
  Other information included with the electronic message.

Feat(E)(sales rep id information) comprises one or more of the following features:
  Sales rep user email address(es);
  Sales rep name;
  Sales rep title or position;
  Other information about the sales rep.

Feat(E)(contact id information) comprises one or more of the following features:
  Contact user email address(es);
  Contact name;
  Contact title or position;
  Entity name associated with the contact (e.g., contact's employer);
  Industry associated with the contact;
  Other information about the contact.

Features of the Candidate Project x

The one or more features of the candidate project P[x] (denoted above as Feat[P[x]]), in turn, comprises at least three sub-parts:

Feat[P[x]]=(Feat(P[x])(project itself), Feat(P[x])(account), Feat(P[x])(interaction history)).

Feat(P[x])(project itself) comprises information about the candidate project x itself. Feat(P[x])(account) comprises information about the unique account corresponding to the candidate project x. Feat(P[x])(interaction history) comprises information about candidate project x based on the interaction history (e.g., historical/previous communications already classified as belonging to the candidate project x).

The feature determination component 204 generates Feat(P[x])(project itself), Feat(P[x])(account), and Feat(P[x])(interaction history) based on information obtained from mapping data 210 and historical electronic messages data 212 for the candidate project x.

Feat(P[x])(project itself) comprises information pertaining or relevant to the candidate project x itself, such as:
  Good(s) or service(s);
  Type of good(s) or service(s);
  Size of the deal;
  Price(s);
  Demonstration(s);
  Description about the candidate project x;
  Any other information about the candidate project x itself.

Feat(P[x])(account) comprises information about the account corresponding to the candidate project x, such as:
  Entity (e.g., entity associated with the sales rep and/or contact);
  Entity profile;
  Uniform Resource Locator (URL) associated with the entity;
  Email domain associated with the entity;
  Account size, previous sales volume, transaction history, duration, etc.;
  Any other information about the account.

Feat(P[x])(interaction history) comprises information from previous messages or interactions, such as:
  Identification and/or content of historical or previous communications (e.g., electronic messages, telephone calls, etc.) classified as belonging to candidate project x;
  Identification of the sales reps and contacts in those previous electronic messages if previous electronic messages exist for the candidate project x (such sales reps and contacts identification may be denoted as: Feat([P[x]])(interact history)(email sales rep id list) and Feat([P[x]])(interact history)(email contact id list));
  Any other information from the interaction history already classified as pertaining to candidate project x.

Features of the Correlation Between Electronic Message E and Candidate Project x The one or more features of Feat[E, P[x]] are based on similarity metrics generated from comparisons of particular feature(s) included in Feat[E] and Feat[P[x]]. For example, the feature determination component 204 looks for similarities between electronic message E and historical electronic messages, if any, that have been associated with the candidate project x. Similarities may also exist between the content of electronic message E and the account and/or activities related to the candidate project x. Some words in the electronic message E may match names of goods/services offered by the entity associated with the candidate project x. Some words in the electronic message E may match names of the business(es) of the entity associated with the candidate project x.

In an embodiment, the feature determination component 204 performs one or more comparisons between data elements to determine respective degrees of similarity or some other indication of the similarity or dissimilarity between the data elements within the comparison pair, which are encapsulated within Feat[E, P[x]]. Example comparison pairs include, but are not limited to:

- Feat(E)(electronic message itself) vs. Feat(P[x])(project itself);
- Content, title, etc. in Feat(E)(electronic message itself) vs. content, name of good/service, offers, etc. in Feat(P[x]) (project itself);
- Feat(P[x])(account) vs. Feat(E)(contact id information);
- Email domain in Feat(P[x])(account) vs. email domain in Feat(E)(contact id information);
- Entity name in Feat(P[x])(account) vs. entity name in Feat (E)(contact id information);
- Zip code in Feat(P[x])(account) vs. zip code in Feat(E) (contact id information);
- Address in Feat(P[x])(account) vs. address in Feat(E)(contact id information);
- City in Feat(P[x])(account) vs. city in Feat(E)(contact id information);
- State in Feat(P[x])(account) vs. city in Feat(E)(contact id information);
- Area code in Feat(P[x])(account) vs. area code in Feat(E) (contact id information);
- URL in Feat(P[x])(account) vs. URL in Feat(E)(contact id information);
- Feat(P[x])(account) vs. Feat(E)(electronic message itself);
- Good/service/product in Feat(P[x])(account) vs. keywords in Feat(E)(electronic message itself);
- Any other data element pairs that may be compared against each other to make a match determination.

For each of the above comparisons, a similarity metric Similarity may be calculated based on the degree of similarity between the pair of compared features. Each Similarity value derived from a pair of compared features can be considered a derived feature and an input for training the machine learning model. In an embodiment, similarity metric Similarity may be in the range of 0 to 1, in which:

- Similarity is set to 1.0 if the compared features are identical to each other.
- Similarity is set to 0.0 if the compared features are completely dissimilar to each other.
- Similarity is set to a value between 0.0 and 1.0 if the compared features has some degree of similarity to each other but is not identical to each other. The value can be calculated based on an edit-distance based string distance metrics between the two strings (which represent the two compared features). For example, comparison of certain features such as email content, entity name, or zip code may result in a similarity metric value between 0.0 and 1.0.

As an example, comparisons of the zip codes below may result in the following similarity metric Similarity values:

- Similarity (zip_code_1=37901, zip_code_2=37901)=1.0 (same)
- Similarity (zip_code_1=37901, zip_code_2=82988)=0.0 (very different)
- Similarity (zip_code_1=37901, zip_code_2=37902)=0.2 (there is a certain degree of similarity)

Additional Potential Features

In an embodiment, if either of the following condition is met, then certain features may be derived by the feature determination component 204 in addition or alternatively to the features discussed above:

- If the sales rep in the electronic message E is included in the list of sales reps identified from previous electronic messages classified as belonging to the candidate project x (from the sales rep list in Feat([P[x])(interact history) (email sales rep id list)); or
- If the contact in the electronic message E is included in the list of contacts identified from previous electronic messages classified as belonging to the candidate project x (from the contact list in Feat([P[x])(interact history)(e-mail contact id list)).

Example features that may be derived or generated include one or more of the following, such features comprising, in some embodiments, an indication of whether any of the following conditions is met:

- Sender of electronic message E is included in the list of contacts identified from previous electronic messages classified as belonging to the candidate project x (from the contacts list in Feat([P[x])(interact history)(email contact id list)).
- Receiver/recipient of electronic message E is included in the list of sales reps identified from previous electronic messages classified as belonging to the candidate project x (from the sales rep list in Feat([P[x])(interact history) (email sales rep id list)).
- Sender of electronic message E and receiver/recipient of electronic message E are the same sender and receiver/recipient pair any of one or more of previous electronic messages associated with candidate project x. The sender-recipient pair information from previous electronic messages may exist in a list of previous electronic message sender recipient pairs.
- Number of times that the sender of electronic message E is a sender in previous electronic messages associated with the candidate project x. Here, looking for the frequency of the particular sender in the relevant previous electronic messages.
- Number of times that the receiver/recipient of electronic message E is a receiver/recipient in previous electronic messages associated with the candidate project x. Here, looking for the frequency of the particular receiver/recipient in the relevant previous electronic messages.

The features described above are appropriately stored in at least the features data 214.

Next in block 322, the project identification component 202 applies the features determined in block 320 for each of the candidate projects of the received electronic message to a machine learning model. The machine learning model is included in the machine learning model scoring component 206, which may also be referred to as a machine learning model component. The n feature sets Feat[1], Feat[2], . . . , Feat[n] (and any other features deemed relevant) comprise inputs from which the machine learning model scoring component 206 outputs a score Score[1], Score[2], . . . , Score[n] for respective candidate projects P[1], P[2], . . . , P[n]. The scores that are calculated may be referred to as prediction scores, project prediction scores, project scores, or the like.

Scores Score[1], Score[2], . . . , Score[n] are quantitative values that are scored relative to each other and which are within a pre-defined range. For instance, the scores may range between 1 and 100, with 100 representing a 100% likelihood that a particular candidate project is the actual project to which the electronic message refers and 1 presenting the least likelihood that a particular candidate project is the actual project associated with the electronic message.

Among other things, the machine learning model scoring component 206 evaluates how similar, the type of similarity(ies), and/or the number of similarity(ies) between one or more features of already-classified previous electronic message(s) and one or more features of the present electronic message in accordance with the particular machine learning model. For example, the similarity metric Similarity calculated for each of the various pairs of comparison features can be used as derived features and inputs for the machine learning model.

In an embodiment, the machine learning model used can be a multi-layer perceptron (MLP) network, which uses back propagation to train the network. In other embodiments, other machine learning models may be used to perform the scoring and/or model training such as, but not limited to, decision tree, support vector machine (SVM), and the like.

In some embodiments, the machine learning model scoring component 206 may perform one or more additional processing or filtering on the feature set for one or more of the candidate projects to improve scores. For example, feature normalization, feature selection, feature weighting, feature construction, feature engineering, or any other further processing or filtering of the features described in connection with block 320 may be performed.

In block 324, the machine learning model scoring component 206 ranks or sorts the set of scores Score[1], Score[2], . . . , Score[n] calculated in block 322 (e.g., from maximum to minimum values) to form a ranked score list.

If there are fewer than two scores within the score list that are similarly high to each other—in other words, there is only a single score that is the highest/maximum within the score list and the second highest score within the score list differs from the highest score by at least a certain pre-defined amount (no branch of block 326), then the project identification component 202 classifies or associates the electronic message with the particular candidate project record having the highest/maximum score, in block 328. The project identification component 202 updates the appropriate records (e.g., electronic message classification data 216 and/or features data 214) with the latest classification and scoring information in block 330.

Conversely, if there are two or more scores within the score list that are high and sufficiently similar to each other (yes branch of block 326), then a user may be provided the opportunity to aid in selection of the project. Two or more scores may be considered high and sufficiently similar to each other if, for example, the highest score and the second highest score within the score list differ from each other by less than a first certain pre-defined amount. If the second highest score and the third highest score differ from each other by less than a second certain pre-defined amount (the first and second certain pre-defined amount may be the same or different from each other), then the highest score, second highest score, and third highest score may all be considered to be scores within the score list that are high and sufficiently similar to each other. In block 332, the project identification component 202 provides the ranked score list for user consideration.

Upon receipt of a project selection from among the candidate project records in block 334, the project identification component 232 classifies or associates the electronic message with the selected particular candidate project record in block 336. The project identification component 202 updates the appropriate records (e.g., electronic message classification data 216 and/or features data 214) with the latest classification and scoring information in block 338.

Alternatively, one or more of blocks 332-336 may be omitted, and the project identification component 202 may select the candidate project with the highest score. In such case, user input need not be required to complete the electronic message classification.

In an embodiment, in block 340, the training component 208 "trains" the machine learning model with baseline information that is used to compare against the feature sets of the present electronic message to calculate a score set for the present electronic message. The baseline information, also referred to as training data or training data set, comprises at least the feature set and identification of the particular project determined for each electronic message of a plurality of previous/historical electronic messages. Because electronic messages are being "labeled" (e.g., corresponding projects being determined) on an on-going basis, the present "labeled" electronic message can comprise a "labeled" previous/historical electronic message in successive training set(s). In some embodiments, an electronic message "label" may be relied upon only if a user classified the electronic message, if the classification occurred in either an automatic or manual manner, or any other criteria. Over time, as more training data becomes available, the predictive accuracy of the machine learning model technique also improves.

As an example, for a given "labeled" previous/historical electronic message known to belong with a particular project P[2], the following training instance may be generated to include in a training set:

{Feat[1]; 0}
{Feat[2]; 1}
{Feat[3]; 0}
. . .
{Feat[n]; 0} where Feat[1], Feat[2], . . . , Feat[n] comprise the n feature sets corresponding to respective candidate projects P[1], P[2], . . . , P[n] of the given previous/historical electronic message, as described above, and the second parameter in the above pair notation denotes which of the candidate projects is the particular project P[2]. The pair notation for Feat[2] is denoted as "1" to specify that the given electronic message is classified with that particular project while all of the other feature sets Feat[x] are denoted as "0" to indicate that those projects were determined not to correspond to the given electronic message.

The above training instance may be repeated for each of the "labeled" previous/historical electronic messages to create the training set. As mentioned above, the feature sets and classification information are stored in at least the features data 214 and electronic message classification data 216.

Block 340 may be performed immediately after the received electronic message has been classified, periodically, after a certain number of electronic messages have been classified, or based on some trigger or frequency that may or may not relate to operations performed to classify the electronic message received in block 302. In some embodiments, the training component 208 may be included in a server, computing device, or data store that is the same or different from the server, computing device, or data store that includes at least the machine learning model scoring component 208.

In this manner, techniques are provided to automatically associate an electronic message with a particular project from among a plurality of projects defined for an organization or entity. The particular project is identified from among the plurality of projects in accordance with at least information contained in the electronic message (e.g., sender(s) and receiver(s)/recipient(s) identified in the electronic message). When more than one projects from among the plurality of projects are identified as candidate or potential projects that the electronic message may be referring to, additional information relating to the electronic message, each of the candidate projects, and correlations between the electronic message and each of the respective candidate projects (collectively referred to as feature sets) are accessed, collated, collected, and/or derived for use as inputs to a machine learning model.

The machine learning model, in turn, outputs a score for each of the candidate projects, the scores indicating the relative likelihood that a particular candidate project is the most relevant project from among the plurality of candidate projects. The particular one of the candidate project deemed to be the project to associate with the electronic message may be automatically determined from the outputted scores (e.g., the project corresponding to the highest score) and/or determined based on user selection of a particular project (e.g., from among the candidate projects having the highest scores). The machine learning model is trained using feature sets and classifications of each of one or more previous electronic messages, in which such feature sets and classifications were previously determined using a previously trained version or iteration of the machine learning model.

The automatic classification of electronic messages of an organization or entity with particular projects provides a number of downstream functionalities. For example, a complete record of what happened in a deal is automatically generated and maintained without having spurious communications unrelated to the deal included in the record. As another example, users need not spend time and effort formulating a recordkeeping scheme (e.g., electronic file folders) and attempt to manually "file" the electronic messages in accordance with some recordkeeping scheme. As still another example, because electronic messages are effectively sorted by different projects and projects that were successful are known (e.g., closed deals, good/service actually sold, contracts signed, etc.), particular electronic message(s) that resulted in the projects' success serve as projects' success criteria. Such electronic message(s) may be studied to optimize electronic message content, timing, and other aspects in other projects. Conversely, electronic messages of unsuccessful projects may be readily studied to determine what not to do in other projects. Lastly, dedicated electronic message addresses, dedicated electronic message groups, dedicated project reference numbers or names, or other project identifying information fields or parameters for inclusion in the electronic messages are unnecessary because the classification techniques described herein collects and derives a plurality of contextual information about the electronic message, projects, and correlations between the electronic message to the projects to predict the most relevant project to the electronic message.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
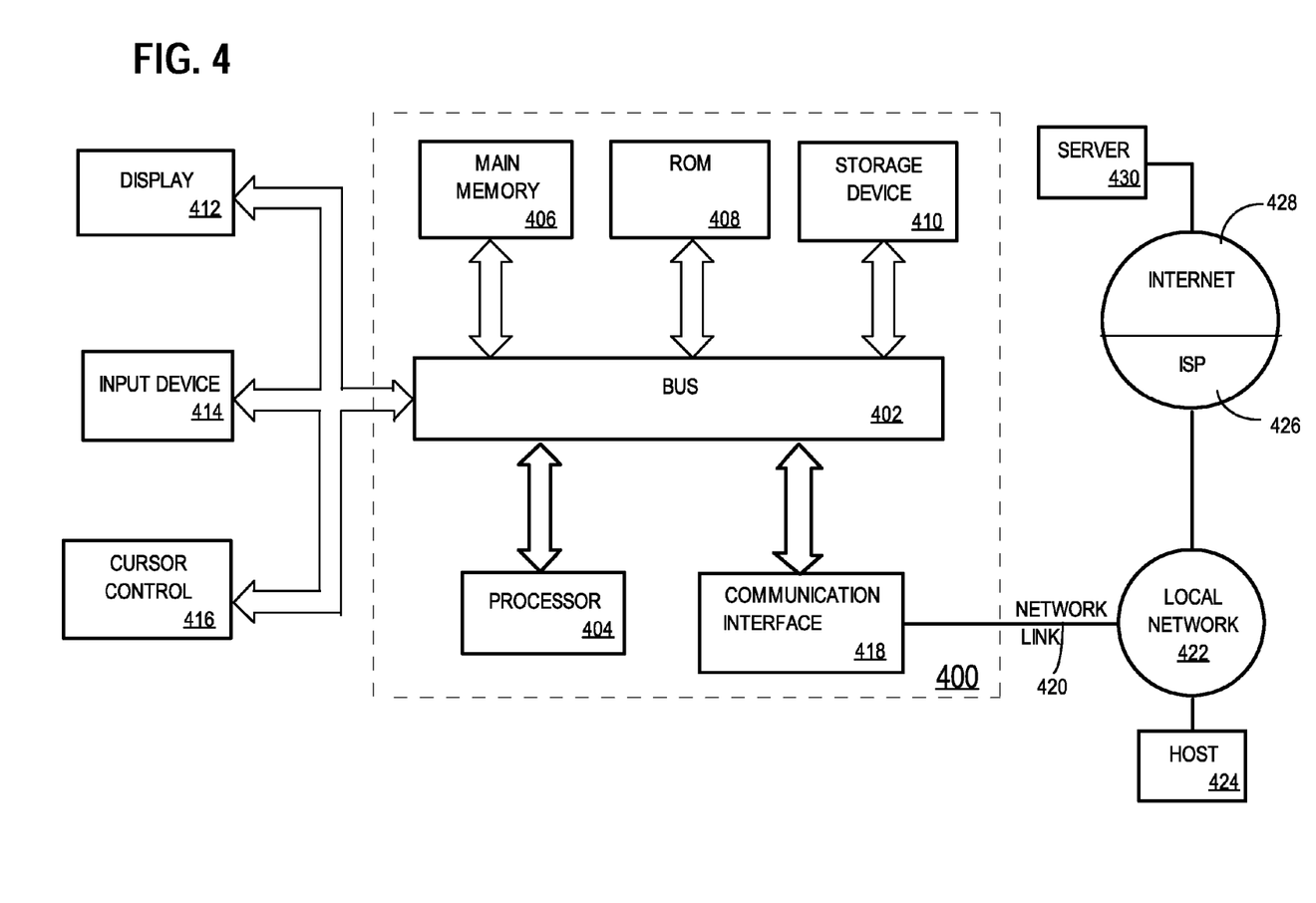
FIG. 4 illustrates a block diagram of an example computer system upon which embodiments of the present disclosure may be implemented.

For example, FIG. 4 is a block diagram that illustrates a computer system 400 upon which embodiments of the present disclosure may be implemented. Computer system 400 may be the server 102, computers 104, 110, 124, or 130, server 136, and/or database 138. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   a data store that stores data that indicates which users of a plurality of users are associated with which projects of a plurality of projects;
   one or more computing devices, wherein one or more first computing devices of the one or more computing devices are operatively coupled to the data store and programmed to:
      identify a first user and a second user associated with a first electronic message;
      based on the data from the data store, determine one or more first projects that are associated with the first user;
      based on the data from the data store, determine one or more second projects that are associated with the second user;
      make a determination as to whether only a single project is common between the one or more first projects and the one or more second projects;
      respond to a determination that only a single project is common between the one or more first projects and the one or more second projects by storing, in the data store, an association between the first electronic message and the single project.

2. The system of claim 1, wherein:
   only a single project is common between the one or more first projects and the one or more second projects;
   the first user is associated with a second electronic message that is not associated with the single project; and
   the one or more first computing devices are further programmed to respond to a request from a client computer for one or more electronic messages associated with the single project by sending to the client computer only those electronic messages that are associated with the single project, wherein the electronic messages associated with the single project include the first electronic message but not the second electronic message.

3. The system of claim 1, wherein:
   the data store or the one or more computing devices includes a machine learning model;
   the one or more first computing devices of the one or more computing devices is programmed to respond to a determination that more or less than a single project is common between the one or more first projects and the one or more second projects by:

collecting one or more first features associated with each of the more or less than the single project in common between the one or more first projects and the one or more second projects;

for each project in the more or less than the single project in common between the one or more first projects and the one or more second projects, generating a project score based on the machine learning model and the one or more first features; and determining that a particular project has a higher project score than any other project in the more or less than the single project in common between the one or more first projects and the one or more second projects, and in response, associating the first electronic message with the particular project.

4. The system of claim 1, wherein:

the data store or the one or more computing devices includes a machine learning model;

the one or more first computing devices of the one or more computing devices is programmed to respond to a determination that more or less than a single project is common between the one or more first projects and the one or more second projects by:

collecting one or more first features associated with the first electronic message;

for each project in the plurality of projects, generating a project score based on the machine learning model and the one or more first features; and determining that a particular project has a higher project score than any other project in the plurality of projects, and in response, associating the first electronic message with the particular project.

5. The system of claim 4, wherein:

the data store includes a plurality of electronic messages;

one or more second computing devices of the one or more computing devices are programmed to generate the machine learning model by, for each electronic message of the plurality of electronic messages stored in the data store:

collecting one or more electronic messages features associated with the electronic message; and training the machine learning model based on the one or more electronic messages.

6. The system of claim 5, wherein at least a first computing device in the one or more first computing devices is also one of the one or more second computing devices.

7. The system of claim 4, wherein:

the data store includes a plurality of electronic messages, wherein each electronic message in the plurality of electronic messages is associated with a project of the plurality of projects;

one or more second computing devices of the one or more computing devices are programmed to generate the machine learning model by, for each electronic message of the plurality of electronic messages:

collecting one or more project features associated with the project that is associated with the electronic message; and training the machine learning model based on the one or more project features.

8. The system of claim 4, wherein:

the data store includes a plurality of electronic messages, wherein each message in the plurality of electronic messages is associated with a project of the plurality of projects;

one or more second computing devices of the one or more computing devices are programmed to generate the machine learning model by, for each electronic message of the plurality of electronic messages:

collecting one or more matching features, wherein each feature in the one or more matching features is associated with the electronic message and the project associated with the electronic message; and training the machine learning model based on the one or more matching features.

9. The system of claim 4, wherein:

the data store includes a plurality of electronic messages, wherein each message in the plurality of electronic messages is associated with a project of the plurality of project;

one or more second computing devices of the one or more computing devices are programmed to generate the machine learning model by, for each electronic message of the plurality of electronic messages:

collecting one or more similar features, wherein each feature in the one or more similar features is associated with the electronic message and is similar to a feature associated with the project associated with the electronic message; and training the machine learning model based on the one or more similar features.

10. The system of claim 1, wherein:

the data store or the one or more computing devices includes a machine learning model;

the one or more first computing devices of the one or more computing devices is programmed to respond to a determination that more or less than a single project is common between the one or more first projects and the one or more second projects by:

collecting one or more first features associated with the first electronic message;

for each project in the plurality of projects, generating a project score based on the machine learning model and the one or more first features;

determining an particular order of the plurality of projects based on the project score for each project in the plurality of projects;

causing a client computer to present the plurality of projects in the particular order to a user;

the one or more first computing devices of the one or more computing devices is programmed to receive input from the user indicating that a particular project should be associated with the first electronic message, and in response, associate the first electronic message with the particular project.

11. A method comprising:

identifying a first user and a second user associated with a first electronic message;

based on data from a data store that indicates which users of a plurality of users are associated with which projects of a plurality of projects, determining one or more first projects that are associated with the first user;

based on the data from the data store, determining one or more second projects that are associated with the second user;

determining whether only a single project is in common between the one or more first projects and the one or more second projects;

in response to the determination that only a single project is in common between the one or more first projects and the one or more second projects, storing, in the data store, an association between the first electronic message and the single project.

12. The method of claim 11, further comprising:
wherein only a single project is in common between the one or more first projects and the one or more second projects and the first user is associated with a second electronic message that is not associated with the single project,
responding to a request from a client computer for one or more electronic messages associated with the single project by sending to the client computer only those electronic messages that are associated with the single project, wherein the electronic messages associated with the single project include the first electronic message but not the second electronic message.

13. The method of claim 11, further comprising:
responding to a determination that more or less than a single project is in common between the one or more first projects and the one or more second projects by:
collecting one or more first features associated with each of the more or less than the single project in common between the one or more first projects and the one or more second projects;
for each project in the more or less than the single project in common between the one or more first projects and the one or more second projects, generating a project score based on a machine learning model and the one or more first features; and
determining that a particular project has a higher project score than any other project in the more or less than the single project in common between the one or more first projects and the one or more second projects, and in response, associating the first electronic message with the particular project.

14. The method of claim 11, further comprising:
responding to a determination that more or less than a single project is common between the one or more first projects and the one or more second projects by:
collecting one or more first features associated with the first electronic message;
for each project in the plurality of projects, generating a project score based on a machine learning model and the one or more first features; and
determining that a particular project has a higher project score than any other project in the plurality of projects, and in response, associating the first electronic message with the particular project.

15. The method of claim 14, further comprising:
generating the machine learning model by, for each electronic message of a plurality of electronic messages stored in the data store:
collecting one or more electronic messages features associated with the electronic message; and
training the machine learning model based on the one or more electronic messages.

16. The method of claim 14, further comprising:
generating the machine learning model by, for each electronic message of a plurality of electronic messages stored in the data store, wherein each electronic message in the plurality of electronic messages is associated with a project of the plurality of projects:
collecting one or more project features associated with the project that is associated with the electronic message; and
training the machine learning model based on the one or more project features.

17. The method of claim 14, further comprising:
generating the machine learning model by, for each electronic message of a plurality of electronic messages stored in the data store, wherein each message in the plurality of electronic messages is associated with a project of the plurality of projects:
collecting one or more matching features, wherein each feature in the one or more matching features is associated with the electronic message and the project associated with the electronic message; and
training the machine learning model based on the one or more similar features.

18. The method of claim 14, further comprising:
generating the machine learning model by, for each electronic message of a plurality of electronic messages stored in the data store, wherein each message in the plurality of electronic messages is associated with a project of the plurality of project:
collecting one or more similar features, wherein each feature in the one or more similar features is associated with the electronic message and is similar to a feature associated with the project associated with the electronic message; and
training the machine learning model based on the one or more similar features.

19. The method of claim 11, further comprising:
responding to a determination that more or less than a single project is in common between the one or more first projects and the one or more second projects by:
collecting one or more first features associated with the first electronic message;
for each project in the plurality of projects, generating a project score based on a machine learning model and the one or more first features;
determining an particular order of the plurality of projects based on the project score for each project in the plurality of projects;
causing a client computer to present the plurality of projects in the particular order to a user;
receiving input from the user indicating that a particular project should be associated with the first electronic message;
in response to the input, associating the first electronic message with the particular project.

* * * * *